Figure 1:
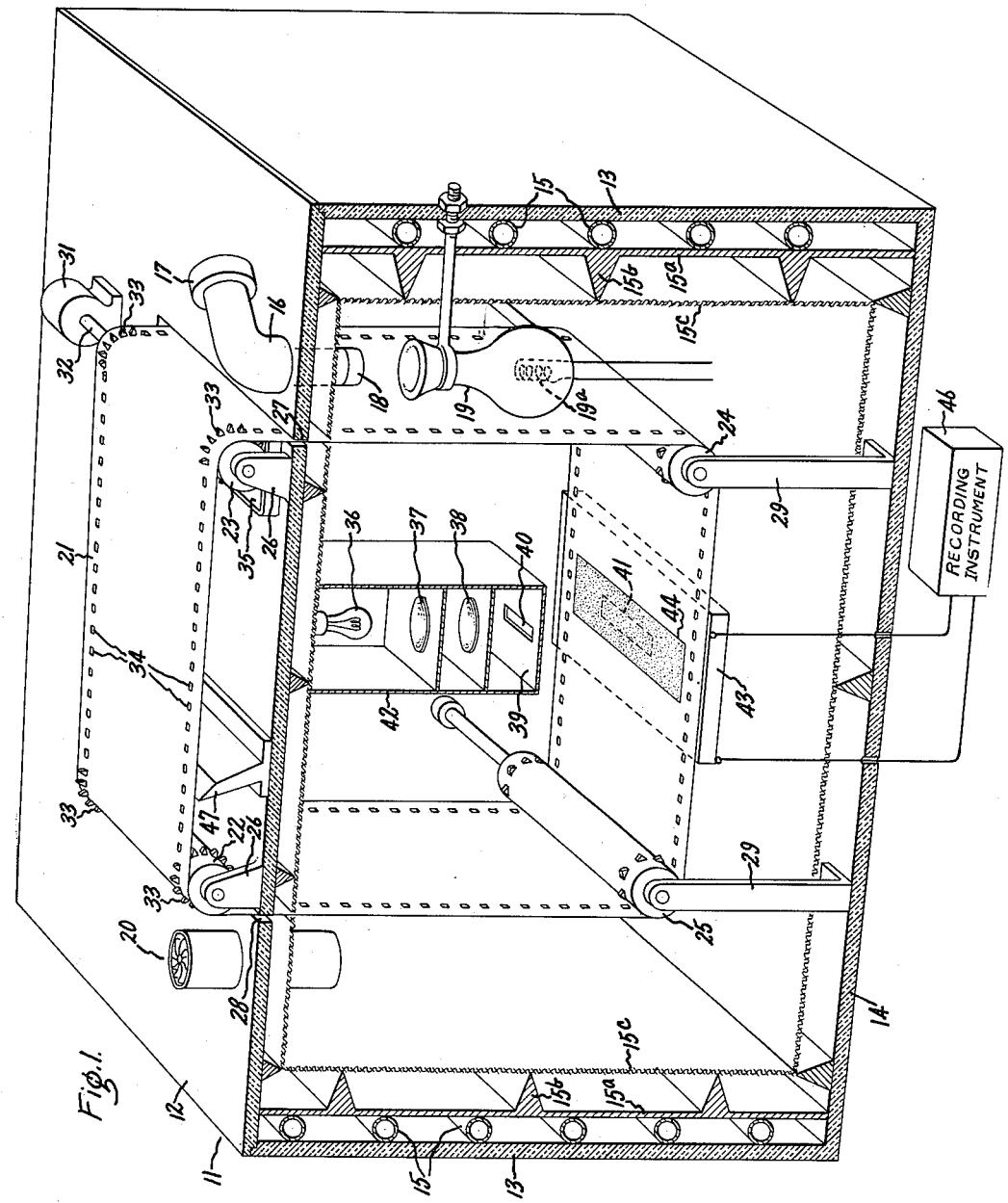

Oct. 25, 1955  V. J. SCHAEFER  2,721,495
METHOD AND APPARATUS FOR DETECTING MINUTE CRYSTAL FORMING
PARTICLES SUSPENDED IN A GASEOUS ATMOSPHERE
Filed March 6, 1952  3 Sheets-Sheet 1

Inventor:
Vincent J. Schaefer,
by Paul A. Frank
His Attorney.

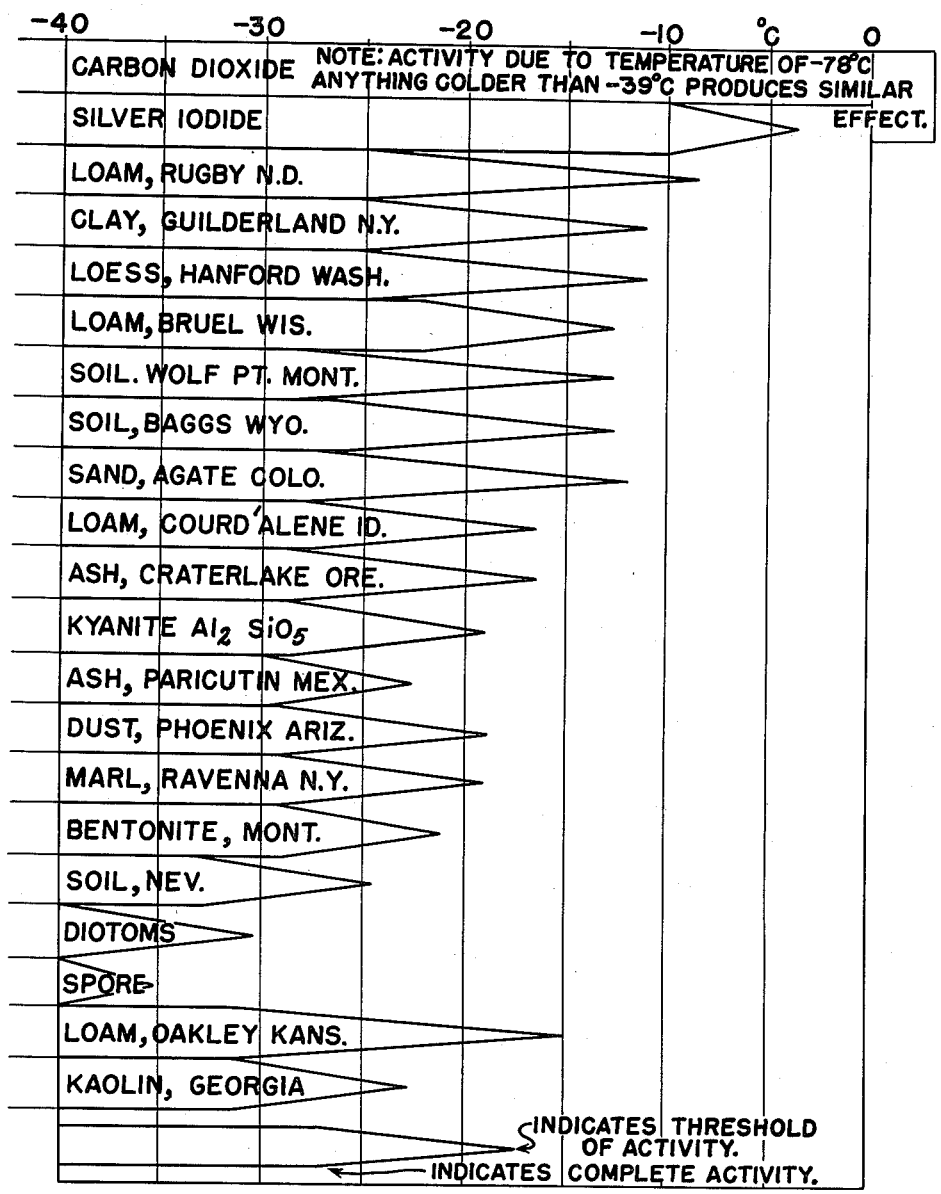
Fig. 2. TEMPERATURE ACTIVITY RELATIONSHIPS OF ICE NUCLEI
Inventor:
Vincent J. Schaefer,
by Paul G. Franke
His Attorney Oct. 25, 1955  V. J. SCHAEFER  2,721,495
METHOD AND APPARATUS FOR DETECTING MINUTE CRYSTAL FORMING
PARTICLES SUSPENDED IN A GASEOUS ATMOSPHERE
Filed March 6, 1952  3 Sheets-Sheet 3
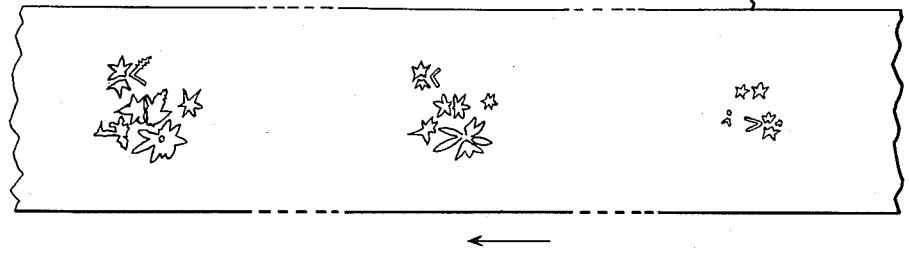
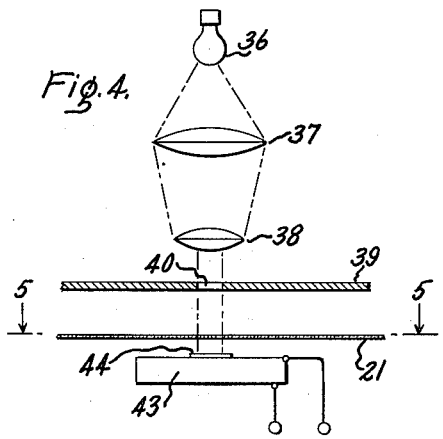
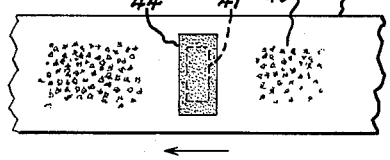
Inventor:
Vincent J. Schaefer,
by Paul A. Frank
His Attorney.

United States Patent Office 2,721,495
Patented Oct. 25, 1955

2,721,495

METHOD AND APPARATUS FOR DETECTING MINUTE CRYSTAL FORMING PARTICLES SUSPENDED IN A GASEOUS ATMOSPHERE

Vincent J. Schaefer, Schenectady, N. Y., assignor to General Electric Company, a corporation of New York Application March 6, 1952, Serial No. 275,204

14 Claims. (Cl. 88—14)

The present invention relates to a new method and apparatus for monitoring or detecting minute nuclei particles suspended in a gaseous medium.

More particularly, the invention relates to a new method and apparatus for monitoring minute particles suspended in air which are known as ice nuclei, and serve as centers of formation about which ice crystals will grow if the proper environmental conditions exist.

Ice nuclei comprise a subdivision of the general class of minute particles known as aerosol particles that are suspended in the atmosphere, and that serve as condensation nuclei (i. e., centers of formation for small droplets of water upon the occurrence of proper conditions, namely, the supersaturation of water vapor in a region). It is well known that the water vapor in an enclosed region can become supersaturated without condensing and precipitating out unless there are condensation nuclei present to serve as centers of formation for the condensation process. A particularly good example of this phenomenon is found in the "Wilson Cloud Chamber," wherein subsequent to the expansion cycle and prior to the introduction of the charged particles (which serve as condensation nuclei) to be tracked into the chamber, the vapor in the chamber is supersaturated, and does not precipitate out until ionized charged particles (condensation nuclei) are introduced into the chamber.

With reference now to the formation of ice crystals, it has been established that a comparable phenomenon exists with regard to the need for the introduction of ice nuclei into a region that is supersaturated with respect to ice (i. e., super cooled below the freezing point of water), but not necessarily supersaturated with respect to water, before the formation of ice crystals in the region will occur. Thus, it can be appreciated that information pertaining to ice nuclei is extremely important in meterological work, since the presence or absence of such ice nuclei is a controlling factor in the formation of ice crystals, and the ice crystals in turn constitute the elemental particles out of which snow storms and hail storms are formed.

While there are many known condensation nuclei monitors presently available in the art, such monitors are not satisfactory for use as detectors of ice nuclei due to the fact that, insofar as present knowledge is able to determine, while all known ice nuclei will serve as condensation nuclei, the reverse is not true for all known condensation nuclei will not serve as ice nuclei. Consequently, the presently available condensation nuclei monitors are not sufficiently discriminating to serve as ice nuclei monitors.

It is, therefore, one object of the present invention to provide a new method and apparatus for monitoring minute particles suspended in a gaseous medium which are capable of serving as centers of formation for the growth of crystals.

Another object of the invention is to provide an automatically operating monitoring apparatus capable of providing a reliable representative count of the ice nuclei contained in the atmosphere, and which is also capable of continuously and economically monitoring samples of the atmosphere over substantial periods of time.

A further object of the invention is to provide an ice nuclei monitoring apparatus having the above set forth characteristics, which can be made responsive to only those ice nuclei formed from desired groups of materials.

A feature of the invention is the provision of a minute particle monitoring apparatus that is particularly suitable for use in monitoring ice nuclei suspended in the atmosphere, and which incorporates a novel method of monitoring such particles. The preferred embodiment of the monitoring apparatus includes a temperature control means for reducing the temperature of a sample of the medium being monitored for minute particles to a preselected value, supply means for introducing a sample of the medium being monitored into the temperature controlled means whereby the temperature of the medium is reduced to the desired preselected value, collecting means disposed within the temperature controlled means and adapted to have a portion of the minute particles contained in the medium collect thereon, means for observing the minute particles collected by the collecting means, and means for serially cleaning the collecting means after observation of the minute particles collected thereby.

Another feature of the invention is the provision of a new minute particle monitoring apparatus which is particularly suitable for use in monitoring ice nuclei suspended in the atmosphere and incorporates a novel method of monitoring ice nuclei in its design. The monitoring apparatus includes temperature controlled means in combination with supply means for introducing a sample of the medium being monitored for ice nuclei into the temperature-controlled means whereby the temperature of the medium is reduced to a desired preselected value. A collector means is disposed within the temperature control means, and is adapted to have a portion of the ice nuclei collect thereon. A means for improving the observability of the ice nuclei collected by the collecting means is also provided so as to facilitate observation and counting of the ice nuclei by means for observing the ice nuclei thus collected and improved.

A further feature of the invention is the provision of an automatically and continuously operable ice nuclei monitoring mechanism, which incorporates in its design all of the new and improved features of construction, and method of operation of the apparatus described above.

Other objects, features, and many of the attendant advantages of this invention will be appreciated more readily as the same becomes understood by reference to the following detailed description, when considered in connection with the accompanying drawings, wherein like parts are identified in each of the several figures by the same reference character, and wherein: Fig. 1 is a perspective view of a partially broken away ice monitoring apparatus designed in accordance with the present invention; Fig. 2 is a chart showing the various temperature-activity relationships of various known ice nuclei particles; Fig. 3 is a plan view of a collecting member comprising a part of the overall ice monitoring apparatus, and illustrates the manner in which the size of an ice nucleus collected on the member becomes amplified in size, the longer the nucleus remains on the member; Fig. 4 is a diagrammatic side view of an optical scanning system and cooperating photocell unit for automatically observing the ice nuclei collected on the above mentioned ice collecting member in the ice nuclei monitoring apparatus; and Fig. 5 is a diagrammatic view taken through plane 5—5 of Fig. 4 that illustrates the manner in which the optical scanning system and photocell unit cooperate to produce an electrical signal indicative of the characteristices of the ice nuclei contained in the medium being monitored.

Referring now to Fig. 1 more particularly, a specific embodiment of an ice nuclei monitoring apparatus incorporating the novel method and features of construction of the present invention is illustrated. The monitoring apparatus includes a temperature controlled means for reducing the temperature of a sample of the medium being monitored for ice nuclei to a preselected value, which means may comprise a refrigerated chamber 11 having a heat insulated, removable top 12, side walls 13, and a bottom 14, all of which have appropriate openings for the passage therethrough of certain elements of the monitoring apparatus in a manner to be described more fully hereinafter. Mounted on the inside of insulated side walls 13 of the chamber are a plurality of tubular members 15 which encircle the interior of chamber 11, and serve to carry a refrigerating fluid that acts to reduce the temperature of the area within the chamber to any desired preselected value. The tubular members 15 are enclosed by a pair of closure members 15a having a plurality of parallel ribs 15b formed on one surface thereof which cooperate with similar ribs on the top and bottom of the chamber to support a black velvet covering 15c. The covering 15c then serves to isolate the interior of the chamber from frost crystals that tend to form on the closure members 15a, and which otherwise might contaminate the interior of the chamber.

Cooperating with the temperature controlled chamber 11, is a supply means for introducing a sample of the medium being monitored for ice nuclei into the chamber whereby the temperature of the sample can be reduced to a desired preselected value. This supply means preferably comprises a vertically disposed conduit 16 supported by, and passing through an opening in top 12, and having a coupling element 17 on the end thereof located outside chamber 17 for connection to an air scoop, a blower, or some other similar means for operatively sampling the medium to be monitored. Connected to the end of conduit 16 disposed within chamber 11, is a nozzle 18 through which the medium being monitored must pass before emerging into the interior of chamber 11, and which serves to provide turbulence to the medium to cause the same to become evenly distributed throughout the interior of chamber 11. The medium then travels within chamber 11 for an extended period of time so as to allow it to become supercooled to the desired preselected value, and to allow the ice nuclei contained therein to be precipitated out in a manner to be described more fully hereinafter. If the medium introduced into chamber 11 has a sufficient amount of moisture entrained therein, then the supercooling will take place immediately and the ice nuclei contained therein will be precipitated out. However, in the event that the medium being monitored does not have sufficient moisture content to provide proper environmental conditions for the ice nuclei to be precipiated out, a moisture source 19 is provided. The moisture source 19 may comprise an open Dewar flask containing water, and a thermostatically controlled heater element for maintaining the temperature of the water at a value such that evaporation occurs at a rate capable of raising the moisture content of the medium to an optimum amount, preferably in the neighborhood of 0.1–0.4 gram of water per cubic meter. The moisture source 19 is preferably adjacent intake conduit 16 so that the medium being introduced through the conduit is properly conditioned with regard to moisture content prior to supercooling.

After supercooling of the medium being monitored and precipitation of a portion of the ice nuclei therein, the medium is then removed by an exhaust blower 20 that preferably comprises a Sirroco-type fan supported in the top of the chamber, and operatively connected to the interior of the chamber through an opening in top 12 so as to comprise a part of the supply means for introducing samples of a medium to be monitored into chamber 12. With the supply means thus constructed, it is possible to intermittently operate the monitoring apparatus at any desired repetition frequency; however, as can be more fully appreciated after a better comprehension of the monitoring method is obtained, the method of monitoring is susceptible to being operated continuously over any desired period of time, and consequently, the above-described supply means is preferably designed for such operation.

In order to best understand the manner in which the ice nuclei are caused to precipitate out of the medium being monitored, it is first necessary to obtain a more complete background knowledge of the ice crystal forming process. As was set forth in a preceding paragraph, a phenomenon exists with regard to the formation of ice crystals which is in almost all respects similar to the formation of small water droplets around centers of condensation, known as condensation nuclei. Therefore, an understanding of the condensation process will be extremely helpful in obtaining a better knowledge of the ice crystal forming process. If air that is completely devoid of particles that could serve as condensation nuclei is saturated with water vapor, and then suddenly cooled by some means such as expanding adiabatically the chamber in which the air is contained, the air becomes supersaturated with respect to water. Upon the introduction of condensation nuclei into the supersaturated air then, a number of small water droplets can be seen to form, which number is directly related to the number of condensation nuclei introduced. The exact manner in which the condensation nuclei causes the formation of the small water droplets, or the exact cause of the effect, is not known. Certain theories have been formulated with regard to this question, however, one of which is that the particular surface structure or configuration of the condensation nuclei causes it to exhibit hygroscopic properties. This theory is based on certain observations, for it has been established that condensation nuclei formed from one particular substance having a certain surface structure are more effective than condensation nuclei formed from other substances having a different surface structure. For example, minute salt (NaCl) particles having a size in the order of molecular dimensions, and a cubicle surface structure, are known to be considerably more effective as condensation nuclei than minute particles of other substances having different surface structures.

With regard now to the ice crystal forming process, environmental conditions which can be said to be analogous to the environmental conditions required for the condensation process must first be obtained before ice crystal formation will occur. The proper environmental condition for the ice crystal formation process can be obtained by supercooling a medium that is assumed to be free of ice nuclei, and which contains some water vapor in it, below the freezing point of water (0° C.). The air thus treated may or may not be supersaturated with respect to water, for the amount of water vapor in the air is not too material to the ice crystal forming process so long as there is enough moisture present to saturate the air when it is cooled. Upon supercooling then, the medium becomes supersaturated with respect to ice. Upon the introduction of ice nuclei into the region thus conditioned, small ice crystals are formed about the ice nuclei as centers and are readily detected within the region by means such as shining a light through the region at some small angle of incidence.

Like its counterpart, the small water droplet forming process, the precise manner in which the ice crystals form about the ice nuclei as centers, and the cause of such formation, is not known. Here again, however, theories have been advanced to explain the process, which are not known to be true, but which are based on observation, and are therefore somewhat credible. It is believed that the ice crystal formation process causes the nuclei to exhibit kryophilic (ice forming) properties, and that the water drawn out of the air or medium in question, which, as previously stated, has some degree of water content, and is supercooled with respect to ice, solidifies upon contact with the surface of the ice nuclei, and thereby commences the growth of the ice crystal. If the region is sufficiently saturated with respect to water, and colder than the melting point of ice, the ice crystals thus commenced will continue to grow by drawing water out of the air in the region at a rate which is dependent upon a number of factors, included amongst which is the temperature of the region, the degree of saturation of the region with respect to water, and the particular surface structure or configuration of the ice nuclei particle. Here again, the surface structure theory is substantiated by the fact that particles having one particular surface structure are much more effective as ice nuclei than particles having a different surface structure. For example, particles or silver iodide salt, which has a hexagonal surface structure or configuration, have a threshold of activity which commences at minus 4° C., and are therefore highly effective as ice nuclei. In comparison, particles of common table salt (NaCl), which have a square or rectangular surface structure or configuration, and, as pointed out, serve as excellent condensation nuclei, will not act as ice nuclei regardless of the temperature of the region into which they are introduced and are therefore ineffective as ice nuclei.

Referring now to Fig. 2 of the drawings, a chart is illustrated which lists a number of the substances whose particles are known to be effective as ice nuclei. The chart also discloses the threshold temperatures at which particles formed from the particular substance begin to act as ice nuclei, and the activity of the particles at temperatures succeeding the threshold temperature, down to minus 40° C. From an examination of Fig. 2, it is apparent that carbon dioxide particles (Dry Ice particles) will serve as highly effective ice nuclei, for they are 100 per cent active at 0° C. due to the fact that the temperature of the particles themselves is at minus 78° C. After Dry Ice, the most effective ice nuclei are particles of silver iodide, for as is shown in Fig. 2, silver iodide particles become effective as ice nuclei at minus 4° C., and are 100 percent effective at minus 10° C. Other substances suitable for use as ice nuclei are listed successively in the order of their activity.

Adverting to Fig. 1 of the drawings, the manner in which ice crystals are caused to form about ice nuclei contained in the samples of the medium introduced into chamber 11 through conduit 16 is believed to be readily apparent. The temperature of the interior of the chamber is reduced to a desired value, depending upon whether or not a more or less qualitative analysis of the nuclei contained in the medium is desired. If an absolute count of all the nuclei contained in the medium is desired, the temperature of the interior of chamber 11 is reduced to approximately −36° C., at which temperature particles of substantially all of the known effective substances are 100% active as ice nuclei. Consequently, the monitoring apparatus will detect substantially all of the ice nuclei contained in the medium. If it is desired to detect only those ice nuclei formed from a particular group of materials, for example, that group of substances having a threshold of activity at −15° C. or less, the temperature of chamber 11 can be adjusted so that the temperature of the sample of the medium introduced through conduit 16 is reduced to only −15° C. The monitoring apparatus will then be effective only to detect those substances among the first eight in the chart shown in Fig. 2.

After introduction of the sample of the medium being monitored through conduit 16 into chamber 11, ice crystals form about the ice nuclei contained in the medium in the above-described manner, and because of the additional weight added to the ice nuclei upon the ice crystals being formed thereabout, the ice crystals with the nuclei as centers of formation tend to precipitate out of the medium. Thus, the process constitutes a convenient method of collecting ice nuclei for the purposes of observation.

In order to facilitate observation of the minute ice crystals formed about the ice nuclei as centers, a means for collecting the ice crystals thus precipitated out of the medium is provided, and comprises a collecting member 21 disposed within chamber 11 in a position such that the minute ice crystals with the nuclei as centers collect thereon by precipitation. In a preferred form of the invention, the collecting member is constructed of a thin plastic material which may be a length of transparent, clear 35 mm. movie film (cellulose acetate) having the ends thereof connected together to form an endless belt. The collecting member thus formed is supported on a plurality of roller means which are disposed within and without chamber 11 to form an endless belt conveyor which extends within the chamber 11 during a portion of its travel, and extends without the chamber for the remainder of its travel. The roller means may comprise a plurality of elongated, cylindrically shaped rollers 22, 23, 24, and 25 which are rotatably supported on chamber 11. The rollers 22 and 23 comprise the upper roller members of the endless belt conveyor system thus formed, and are journaled in a pair of upright supports 26 mounted on the outer surface of top 12 adjacent a pair of elongated slots 27 and 28, by means of which the collecting member 21 is allowed to extend from outside the chamber 11 into and through the interior of the chamber. The rollers 24 and 25 comprise the lower roller members of the endless belt conveyor in question, and are supported within the interior of chamber 11 between a pair of upright supports 29 extending up from the bottom of the chamber, and the back wall of the chamber in a manner such that the portion of the collecting member 21 extending between the subject rollers is maintained substantially parallel to the bottom of chamber 11 in a table-like fashion. The endless belt conveyor system thus constructed is driven by a motor 31 secured to the top of chamber 11 and operatively coupled through a shaft 32 to rotatably supported roller 23. Each of the rollers 22—25 has a sprocket wheel 33 secured to each end thereof by keying or some similar means, which coact with a series of apertures, indicated at 34, in the edges of the collecting member 21 to maintain the collecting member 21 slightly above and out of engagement with the rollers. Upon rotation of the roller 23 by motor 31, the sprockets on the sprocket wheels 33 positively engage the sides of the apertures 34 in collecting member 21 and cause the same to be moved through the path defined by the roller means in a direction dependent upon the direction of rotation of motor 31, for example, clockwise as seen by an observer viewing Fig. 1. As the collecting member 21 moves through a complete cycle of rotation, the portion of its length within chamber 11 that is disposed between rollers 24 and 25, and parallel to the bottom of the chamber 11, has the minute ice crystals formed about the ice nuclei as centers, collect thereon as they precipitate out of the suspending medium. The collected ice nuclei can then be readily observed by observation means (to be described more fully hereinafter) included as part of the monitoring apparatus. While the collecting member has been described as comprising an endless belt conveyor, it should be understood that, if desired, a continuous length of collecting member may be run through the temperature controlled chamber in carrying out the monitoring method, and later expended after only a single run. The roller means for moving the collecting member would have to be modified in order to utilize the expendable type of collecting member; however, such modification is believed obvious and therefore will not be described.

In order to facilitate observation of the ice nuclei collected on the above-described collecting member, a means for improving the observability of the ice nuclei is included in the preferred form of the monitoring apparatus. This last-mentioned means preferably comprises a means for amplifying the size of the ice crystals formed about the ice nuclei as centers and also changing the light scattering characteristics of the ice crystals thus formed, both of which measures make the ice nuclei more readily observed. Either one of the above-described measures can be used to improve the observability of the ice nuclei collected on collecting member 21, but the preferred embodiment of the invention utilizes both measures. For this purpose, a tank 35 is supported on the top of chamber 11 underneath one of the rollers 22 or 23, for example, roller 23. Contained within the tank 35 is a dilute solution of a water soluble material into which an increased diameter, rubber-coated portion of the roller 23 (not shown) dips as the roller is rotated. This increased diameter portion of roller 23 contacts the under surface of the collecting member 21, and serves to coat a portion of the width of the under portion of collecting member 21 intermediate, but not including, the rows of apertures 34 with the dilute solution of water soluble material. This dilute solution of water soluble material then improves the light modifying characteristics of the crystals by increasing their size and their ability to scatter or to otherwise affect the transmission of light rays impinging thereon. A particular material which has been found to be satisfactory for this use is a 3 to 5 percent solution of polyvinyl alcohol maintained in tank 35 at a level such that the lower half of roller 23 dips into the material as it is rotated by motor 31, and the material drawn up by the roller and deposited on the under surface of the collecting member 21 as the same comes into contact with the roller. In this fashion, a somewhat even coating of the dilute solution of water soluble material is formed on the surface of the collecting member 21, which will be disposed upward upon the particular portion of the length of collecting member in question being positioned intermediate rollers 24 and 25.

As the portion of collecting member 21 in question travels downwardly between rollers 23 and 24 with a coating of the dilute solution of water soluble material, the temperature of the solution is reduced to the value of the temperature existing within chamber 11. Consequently, the water contained in the solution is likewise cooled to the same value, and, because the temperature value selected is generally below the freezing point of water (0° C.), the water in the solution becomes supercooled. However, very few, if any, ice crystals form on the portion of collecting member 21 in question while it is disposed between rollers 23 and 24, due to the fact that the path of travel of the collecting member is substantially parallel to the path of the precipitated, minute ice crystals being formed within chamber 11 around the ice nuclei as centers. However, after the portion of collecting member 21 in question has passed over roller 24, it becomes disposed transverse to the path of travel of the precipitating, minute ice crystals formed about the ice nuclei as centers, and thereafter will serve to collect the ice nuclei during the remainder of its travel between rollers 24 and 25. Upon the portion of collecting member 21 reaching this point in its travel, the dilute solution of water soluble material coated thereon has been supercooled, and consequently, whenever any one of the ice crystals growing about an ice nucleus, and floating in the supercooled cloud within chamber 11, comes in contact with the collecting member, the minute ice crystal with the ice nucleus as a center serves to seed the supercooled water film, and thus forms an even larger ice crystal on the surface of collecting member 21. This result occurs due to the fact that there is a surplus of water available on the surface of the collecting member which is supercooled with respect to ice, and, the existence of this condition causes the ice crystals forming on the surface of the collecting member to grow increasingly larger with the passage of time. The phenomenon is illustrated in Fig. 3, wherein it can be seen that upon the minute ice crystal precipitated out of the medium in chamber 11 first contacting collecting member 21, the crystals are very small and barely distinguishable. Then, as the collecting member 21 travels from right to left through chamber 11, the crystals continually grow in the manner shown until, if they were allowed to do so, they would entirely cover the surface of the coating of dilute solution of water soluble material on collecting member 21. Thus, as the collecting member moves from right to left through chamber 11, the size of the minute ice crystals precipitated out of the medium being monitored, and collected on the collecting member, is amplified. Also, because of the water soluble material in solution with the water forming the amplified ice crystals, the observability of the amplified ice crystals is further improved by the change induced in the light scattering ability of the crystals, the light absorption ability of the crystals, etc. by reason of the characteristics of such material.

In order to detect or count the number of ice crystals having the ice nuclei as centers that are collected on collecting member 21, a means for observing the collected ice crystals is provided. This means comprises an optical scanning means which includes a light source 36 supported within chamber 11 at a point over the length of collecting member 21 disposed between rollers 24 and 25. Likewise supported within chamber 11 intermediate collecting member 21 and light source 36, is a lens assembly including a first lens 37, and a second lens 38 for forming the light rays passing therethrough from light source 36 into parallel paths. The parallel light rays formed by the lens assembly are directed against an apertured plate 39 having an aperture 40 therein disposed immediately adjacent the water soluble material coated surface of collecting member 21 so that the parallel light rays passing through the aperture form a light image on the surface of collecting member 21 which has a configuration similar to that of aperture 40, in the manner illustrated by the dotted lines 41 in Fig. 1. The combination of elements thus assembled comprises an optical scanning means for observing the collected ice crystals, and for the purpose of convenience, may be mounted within a supporting structure 42 having a plurality of decks which serve to support the respective lens 37 and 38, and apertured plate 39 in assembled relation.

The ice crystal observing means further includes a light sensitive device 43 that is supported within chamber 11, but is disposed on the side of collecting member 21 opposite the optical scanning means in a position such that the light image formed by the parallel light rays passing through aperture 40 in plate 39 would normally pass through the collecting member 21, and form an image on its surface in the manner indicated at 41 in Fig. 5. The light sensitive device 43 preferably comprises a blocking layer selenium photocell, and has a light trap 44 formed on its surface in a position such that the light image 41 is focused thereon in the manner shown in Fig. 4 of the drawing. Consequently, the light rays from aperture 40 normally pass directly through collecting member 21, and fall upon the light trap 44 so as not to produce an output signal in the light sensitive device 43, if no ice crystals are present on collecting member 21.

With the above-described construction, and assuming that the portion of collecting member 21 disposed between apertured plate 39 and light sensitive device 43 is transparent to white light, the light image 41 formed by the parallel light rays passing through aperture 40 impinges upon light trap 44 which may comprise a darkened area that substantially absorbs all of the light reaching it, and none, or a very little light will be scattered. Hence, none of the light from source 36 will impinge upon the light sensitive surfaces of device 43, and no output signal will be developed thereby. However, upon a portion of the length of collecting member 21 having the improved observability ice crystals formed thereon, such as the area 45, being disposed between apertured plate 39 and light sensitive device 43, all of the light rays passing through aperture 40 in plate 39 do not pass through and impinge upon light trap 44, but instead, some of the rays will impinge upon the ice crystals formed on the surface of the collecting member, and will be scattered thereby. The scattered rays will then impinge upon the light sensitive surface of the device 43, and will result in the production of an output electrical signal. The character of this electrical signal will depend upon the amount of light scattered, and the amount of light scattered is a function of a number of ice crystals, which are in turn a function of the number of ice nuclei contained in the medium being monitored. Consequently, the electrical signal developed by photo sensitive device 43 is indicative of the characteristics of the ice nuclei contained in the medium being monitored.

In order to obtain an indication of the electrical signal thus produced, the output of photocell 43 is connected to an indicating device 46 positioned outside chamber 11, and comprising either permanent recording apparatus, an instrument for producing an instantaneous indication of the value of the electrical signal, or some other means for producing a perceptible indication of the nature of the electrical signal.

In operation, the medium to be monitored for ice nuclei is operatively connected by some means such as a blower or an air scoop, through conduit 16 to the interior of temperature controlled chamber 11 where the medium, along with the ice nuclei contained therein, is somewhat evenly distributed throughout the interior of the chamber by reason of the turbulence created by nozzle 18. Because of the lower temperature of the interior of chamber 11, the temperature of the medium is reduced to a preselected value such that desired groups of ice nuclei contained therein have minute ice crystals formed thereon in the manner previously described, and begin to precipitate out of the medium. Simultaneously with this action, a particular portion of the length of collecting member 21 passes over roller 23 by means of which it is coated with a dilute solution of the water soluble material, and thereafter passes down into the interior of temperature controlled chamber 11 where the temperature of the dilute solution of water soluble material is reduced to the desired preselected value. Upon the portion of the length of collecting member 21 in question reaching the area intermediate rollers 24 and 25, the minute ice crystals formed about the ice nuclei as centers collect thereon, are amplified, and have the light modifying characteristics thereof changed in the manner described, as the portion of the length of the collecting member continuously moves from right to left through the interior of the chamber. As the portion comes between aperture plate 39 and light sensitive device 43, the ice crystals collected thereon cause the parallel rays of light passing through aperture 40 to be scattered in a manner dependent upon the number of crystals formed, and the scattered light rays impinge upon the surface of light sensitive device 43 to thereby produce an electrical signal which is indicative of the characteristics of the ice nuclei contained in the medium introduced through conduit 16. Thereafter, the particular portion of the length of collecting member 21 in question passes up out of temperature controlled chamber 11 to the exterior of the chamber which is at a temperature considerably higher than the freezing point of water. Consequently, as the portion moves between rollers 22 and 23, the dilute solution of water soluble material along with the collected ice nuclei melts, and falls off of the material, or is scraped off by a cleaning means 47 engaging the under surface of the collecting member, and operatively supported by chamber 11. The particular portion of the length of collecting member 21 is then ready to perform the same cycle upon reaching 23.

The particular speed at which the apparatus operates depends upon a large number of factors, primary amongst which is the time required for the medium introduced into chamber 11 to be supercooled to a point such that minute ice crystals are formed about the ice nuclei contained therein, and for the minute ice crystals thus formed to precipitate out of the medium, and collect upon the collecting member 21. Other important factors affecting the speed of operation of the device are the time required to supercool the medium being monitored to the desired temperature value, and the position of the optical scanning means and light sensitive device 43 with relation to the point at which the minute ice crystals having the ice nuclei as centers first commenced to collect upon the endless collecting member 21, for it is desired that the amplified ice crystals on collecting member 21 be observed prior to the time that the ice crystals grow sufficiently large to occupy all of the area of the coating on the surface of the collecting member 21. With the above factors in mind, the speed of motor 31 can be adjusted so that as the collecting member 21 is continuously moved around its endless path, samples of the medium being monitored are continuously introduced through supply conduit 16, and the samples thereof which have had the ice nuclei contained therein observed, are continuously exhausted through outlet 19 to thereby achieve continuous and automatic monitoring of a medium with the apparatus.

From the foregoing description, it can be appreciated that the invention provides a new method and apparatus which can be automatically operated to provide a reliable representative count of the ice nuclei contained in the atmosphere, and which can be continuously run economically over substantial periods of time. The apparatus can also be readily adjusted to respond to only those ice nuclei formed from desired groups of substances, and further can be embodied in a compact, simple, and cheap-to-construct mechanism that can be easily operated by comparatively unskilled persons.

While the method and apparatus comprising the present invention have been described as primarily for use in detecting ice nuclei that are suspended in the atmosphere, it should be understood that the invention is not restricted to use in this manner for the unit will operate satisfactorily to detect minute crystal forming particles of the materials listed in Fig. 2, which are suspended in other supercooled gaseous media. For example, the method and apparatus will operate to detect minute crystal forming nuclei particles of the above materials which are suspended in supercooled gases such as $Ca(NO_3)_2 \cdot 4H_2O$, $Na_2S_2O_3 \cdot 5H_2O$ and $Na_2SO_4 \cdot 10H_2O$. Further, when used with supercooled gases of substances other than the atmosphere, the apparatus will serve to detect minute particles of materials other than those listed in Fig. 2. For example, crystals can be formed from a supercooled sample of $Na_2SO_4 \cdot 10H_2O$ if the sample has minute particles of borax ($Na_2B_4O_7 \cdot 10H_2O$) suspended therein. Consequently, it can be appreciated that the invention comprises a new general purpose method and apparatus for detecting or monitoring minute crystal forming nuclei particles suspended in gaseous mediums.

In the light of the above description, it is believed obvious that other modifications and variations of the invention will be suggested to those skilled in the art. It is, therefore, to be understood that changes may be made herein which are within the full intended scope of the invention as defined by the appended claims.

What I claim as new and desire to secure by Letters Patent of the United States is:

1. The method of selectively detecting minute crystal nuclei particles contained in a medium which comprises reducing the temperature of a sample of the medium to a predetermined value below the melting point of the crystalline material of which said particles comprise nuclei, maintaining the sample of the medium at the predetermined temperature value, collecting in an observation area a portion of the nuclei particles appearing as a result of the cooling process, optically detecting the collected nuclei, and serially cleaning the observation area of the collected nuclei.

2. The method of selectively detecting minute crystal nuclei particles contained in a medium which comprises reducing the temperature of a sample of the medium to a predetermined value below the melting point of the crystalline material of which said particles comprise nuclei maintaining the sample of the medium at the predetermined temperature value, collecting in an observation area a portion of the nuclei particles appearing as a result of the cooling process, improving the observability of the collected nuclei by increasing the size thereof, and optically detecting the collected improved observability nuclei.

3. The method of selectively detecting minute crystal nuclei particles contained in a medium which comprises reducing the temperature of a sample of the medium to a predetermined value below the melting point of the crystalline material of which said particles comprise nuclei, maintaining the sample of the medium at the predetermined temperature value, collecting in an observation area a portion of the nuclei particles appearing as a result of the cooling process, improving the observability of the collected nuclei by amplifying the size and changing the light scattering characteristics thereof, optically detecting the collected and modified nuclei, and serially cleaning the observation area of the collected nuclei.

4. The method of selectively detecting minute crystal nuclei particles contained in a medium which comprises reducing the temperature of a sample of the medium to a predetermined value below the melting point of the crystalline material of which said particles comprise nuclei, maintaining the sample of the medium at the predetermined temperature value, collecting in an observation area a portion of the nuclei particles appearing as a result of the cooling process, illuminating the collected nuclei with a beam of light to produce a varying intensity light signal, the variations in intensity of which are proportional to the characteristics of the nuclei, converting the varying intensity light signal to an electrical signal indicative of the characteristics of the nuclei contained in the medium, and serially cleaning the observation area of the collected nuclei.

5. The method of selectively minute crystal nuclei particles contained in a medium which comprises reducing the temperature of a sample of the medium to a predetermined value below the melting point of the crystalline material of which said particles comprise nuclei, maintaining the sample of the medium at the predetermined temperature value, collecting in an observation area a portion of the nuclei particles appearing as a result of the cooling process, amplifying the size and changing the light scattering characteristics of the nuclei thus collected to improve the light ray-modifying characteristics thereof, illuminating the collected amplified nuclei with a beam of light to produce a varying intensity light signal, the variations in intensity of which are proportioned to the characteristics of the nuclei, and converting the varying intensity light signal to an electrical signal indicative of the characteristic of the nuclei contained in the medium.

6. A minute crystal nuclei particle selective detecting device including in combination a temperature controlled chamber for reducing the temperature of a sample of the medium being tested for minute crystal nuclei particles to a preselected value below the melting point of the crystalline material of which said particles comprise nuclei and for maintaining the temperature of the sample at such value, supply means for introducing a sample of the medium being tested into said temperature controlled chamber to reduce the temperature thereof to the desired preselected value, collecting means disposed within said temperature controlled chamber and adapted to have a portion of the nuclei contained in a sample of the medium collected thereby, means for observing the nuclei collected by said collecting means, and means for serially cleaning said collecting means after observation thereof.

7. A minute crystal nuclei particle selective detecting device including in combination a temperature controlled chamber for reducing the temperature of a sample of the medium being tested for minute crystal nuclei particles to a preselected value below the melting point of the crystalline material of which said particles comprise nuclei and for maintaining the temperature of the sample at such value, supply means for introducing a sample of the medium being monitored into said temperature controlled chamber to reduce the temperature thereof to the desired preselected value, collecting means disposed within said temperature controlled chamber and adapted to have a portion of the nuclei contained in a sample of the medium collected thereby, means for improving the observability of the nuclei collected by said collecting means, and means for observing the nuclei thus collected and improved.

8. A minute crystal nuclei particle selective detecting device including in combination a temperature controlled chamber for reducing the temperature of a sample of the medium being tested for minute crystal nuclei particles to a preselected value below the melting point of the crystalline material of which said particles comprise nuclei and for maintaining the temperature of the sample at such value, supply means for introducing a sample of the medium being tested into said temperature controlled chamber to reduce the temperature thereof to the desired preselected value, collecting means disposed within said temperature controlled chamber and adapted to have a portion of the nuclei contained in a sample of the medium collect thereon, means for amplifying the size and light modifying characteristics of the nuclei collected by said collecting means whereby the observability of the collected nuclei is improved, and means for observing the improved observability nuclei collected by said collecting means.

9. A minute crystal nuclei particle selective detecting device including in combination a temperature controlled chamber for reducing the temperature of a sample of the medium being tested for minute crystal nuclei particles to a preselected value below the melting point of the crystalline material of which said particles comprise nuclei and for maintaining the temperature of the sample at such value, supply means for continuously and sequentially introducing and exhausting samples of the medium being tested into said temperature controlled chamber to reduce the temperature thereof to the desired preselected value, collecting means disposed within said temperature controlled chamber and adapted to have a portion of the nuclei contained in a sample of the medium collect thereon, optical means for continuously and automatically observing the nuclei collected on said collecting means, electrically operable light sensitive means cooperating with said optical means for producing an electrical signal indicative of the characteristics of the nuclei contained in the medium, and means for serially cleaning said collecting means after observation thereof.

10. A minute crystal nuclei particle selective detecting device including in combination a temperature controlled chamber for reducing the temperature of a sample of the medium being tested for minute crystal nuclei particles to a preselected value below the melting point of the crystalline material of which said particles comprise nuclei and for maintaining the temperature of the sample at such value, supply means for continuously and sequentially introducing and exhausting samples of the medium being tested into said temperature controlled chamber to reduce the temperature thereof to the desired preselected value, collecting means disposed within said temperature controlled chamber and adapted to have a portion of the nuclei contained in a sample of the medium collect thereon, means for improving the observability of the nuclei collected by said collecting means, optical means for continuously and automatically observing the nuclei collected on said collecting means, electrically operable light sensitive means cooperating with said optical means for producing an electrical signal indicative of the characteristics of the nuclei contained in the medium, and automatically operating means for serially cleaning said collecting means after observation thereof.

11. A minute crystal nuclei particle selective detecting device including in combination a refrigerated chamber having heat insulated wall portions for reducing the temperature of a sample of the medium being tested for minute nuclei particles and introduced therein to a preselected temperature value and for maintaining the temperature of the sample at such value, supply inlet and exhaust outlet means secured to said chamber for continuously passing a sample of the medium being monitored through said temperature controlled chamber, a plurality of roller means secured to the outside of and within said chamber and defining a path for an endless belt conveyor, a collecting member comprising an endless belt of relatively clear plastic material disposed over said roller means with a portion thereof extending through the refrigerated interior of said chamber and a portion thereof extending outside of said chamber, the portion of said endless belt of plastic material located within said chamber being adapted to have a portion of the nuclei contained in a sample of the medium being monitored collect thereon, and means for observing and counting the nuclei collected on the portion of said endless belt within said chamber.

12. A minute crystal nuclei particle selective detecting device including in combination a refrigerated chamber having heat insulated wall portions for reducing the temperature of a sample of the medium being tested for nuclei and introduced therein to a preselected temperature value and for maintaining the temperature of the sample at such value, supply inlet and exhaust outlet means secured to said chamber for continuously passing a sample of the medium being monitored through said temperature controlled chamber, a plurality of roller means secured to the outside of and within said chamber and defining a path for an endless belt conveyor, a collecting member comprising an endless belt of relatively clear plastic material disposed over said roller means with a portion thereof extending through the refrigerated interior of said chamber and a portion thereof extending outside of said chamber, the portion of said endless belt of plastic material located within said chamber being adapted to have a portion of the nuclei contained in a sample of the medium being monitored collect thereon, optical means for observing and counting the nuclei collected on the portion of said endless belt within said chamber, said optical means including a source of light rays, a lens assembly forming the light rays from said source into parallel paths and directing the beam thus formed against the portion of said endless belt upon which nuclei are collected, and an apertured mask disposed between said lens assembly and the portion of said endless belt being observed whereby only a predetermined pattern of parallel rays of light is allowed to impinge upon the said portion of said endless belt, a blocking layer selenium photocell disposed on the side of said endless belt opposite said apertured mask in a position such that the parallel rays of light passing through the aperture therein would normally impinge upon a portion of the surface thereof, and a light trap having a form similar to the shape of the aperture in said mask located between said endless belt and said photocell to prevent the parallel light rays passing through the apertured mask from impinging directly on the surface of said photocell, said light trap having dimensions such that light rays scattered by reason of nuclei collected on the surface of the portion of said endless belt being surveyed impinge on the surface of said photocell whereby an electrical signal is produced which is indicative of the number of nuclei contained in the medium being monitored.

13. A minute crystal nuclei particle selective detecting device including in combination a refrigerated chamber having heat insulated wall portions for reducing the temperature of a sample of the medium being tested for ice nuclei and introduced therein to a preselected temperature value and for maintaining the temperature of the sample at such value, supply inlet and exhaust outlet means secured to said chamber for continuously passing a sample of the medium being monitored through said temperature controlled chamber, a plurality of roller means secured to the outside of and within said chamber and defining a path for an endless belt conveyor, a collecting member comprising an endless belt of relatively clear plastic material disposed over said roller means with a portion thereof extending through the refrigerated interior of said chamber and a portion thereof extending outside of said chamber, the portion of said endless belt of plastic material located within said chamber being adapted to have a portion of the nuclei contained in a sample of the medium being monitored collected thereon, means coacting with at least one side of said endless belt to coat a portion of the same with dilute solution of water soluble material having a desired color characteristic whereby the size of the collected nuclei is amplified and the color thereof changed to thereby improve the observability of the nuclei, means for observing and counting the improved observability nuclei collected on the portion of said endless belt within said chamber, said optical means including a source of light rays, a lens assembly forming the light rays from said source into parallel paths and directing the beam thus formed against the portion of said endless belt upon which nuclei are collected and an apertured mask disposed between said lens assembly and the portion of said endless belt being observed whereby only a predetermined pattern of parallel rays of light is allowed to impinge upon the said portion of said endless belt, and a blocking layer selenium photocell disposed on the side of said endless belt opposite said apertured mask in a position such that the parallel rays of light passing through the aperture therein would normally impinge upon a portion of the surface thereof, a light trap having a form similar to the shape of the aperture in said mask located between said endless belt and said photocell to prevent the parallel light rays passing through the apertured mask from impinging directly on the surface of said photocell, said light trap having dimensions such that light rays scattered by reason of nuclei collected on the surface of the portion of said endless belt being surveyed impinge on the surface of said photocell whereby an electrical signal is produced which is indicative of the number of nuclei contained in the medium being monitored.

14. An ice crystal nuclei selective detecting device including in combination a refrigerated chamber having heat insulated wall portions for reducing the temperature of a sample of the atmosphere being tested for ice nuclei and introduced therein to a preselected temperature value and for maintaining the temperature of the sample at such value, supply inlet and exhaust outlet means secured to said chamber for continuously passing a sample of the atmosphere being monitored through said temperature controlled chamber, a plurality of roller means secured to the outside of and within said chamber and defining a path for an endless belt conveyor, a collecting member comprising an endless belt of clear solid cellulose acetate disposed over said roller means with a portion thereof extending through the refrigerated interior of said chamber and a portion thereof extending outside of said chamber, the portion of said endless belt of cellulose acetate located within said chamber being adapted to have a portion of the ice nuclei contained in a sample of the atmosphere being monitored collect thereon, means coacting with at least one side of said endless belt to coat a portion of the same with a dilute solution of polyvinyl alcohol whereby the size of the collected ice nuclei is amplified and the color thereof changed to thereby improve the observability of the nuclei, optical means for observing and counting the improved observability ice nuclei collected on the portion of said endless belt within said chamber, said optical means including a source of light rays, a lens assembly forming the light rays from said source into parallel paths and directing the beam thus formed against the portion of said endless belt upon which ice nuclei are collected, and an apertured mask disposed between said lens assembly and the portion of said endless belt being observed whereby only a predetermined pattern of parallel rays of light is allowed to impinge upon the said portion of said endless belt, a blocking layer selenium photocell disposed on the side of said endless belt opposite said apertured mask in a position such that the parallel rays of light passing through the aperture therein would normally impinge upon a portion of the surface thereof, a light trap having a form similar to the shape of the aperture in said mask located between said endless belt and said photocell to prevent the parallel light rays passing through the apertured mask from impinging directly on the surface of said photocell, said light trap having dimensions such that light rays scattered by reason of ice nuclei collected on the surface of the portion of said endless belt being surveyed are allowed to impinge on the surface of said photocell whereby an electrical signal is produced which is indicative of the number of ice nuclei contained in the medium being monitored, electrically operable indicator means operatively coupled to said photocell for producing an indication of said electrical signal, and cleaning means comprising a wiper blade secured to said chamber and engaging the water soluble material coated surface of said endless belt for cleaning the same of ice nuclei, said cleaning means being located at a point subsequent to said optical means along the direction of travel of said endless belt.

References Cited in the file of this patent

UNITED STATES PATENTS

| Number | Name | Date |
|---|---|---|
| 1,207,518 | Eddy | Dec. 5, 1916 |
| 2,076,553 | Drinker et al. | Apr. 13, 1937 |
| 2,076,554 | Drinker et al. | Apr. 13, 1937 |
| 2,153,568 | Johnson | Apr. 11, 1939 |
| 2,429,474 | McMahon | Oct. 21, 1947 |
| 2,489,286 | Grant | Nov. 29, 1949 |

FOREIGN PATENTS

| Number | Country | Date |
|---|---|---|
| 642,167 | Germany | Feb. 24, 1937 |
| 396,390 | Great Britain | Aug. 1, 1933 |